US012560227B2

(12) United States Patent
Zach et al.

(10) Patent No.: US 12,560,227 B2
(45) Date of Patent: Feb. 24, 2026

(54) BALL SCREW DRIVE

(71) Applicant: SFS Group International AG, Herrbrugg (CH)

(72) Inventors: Marijo Zach, Widnau (CH); Jasmin Hanselmann, Altstätten (CH); Alexander Christoph Staudigl, Bezau (AT); Ralph Sieber, Diepoldsau (CH)

(73) Assignee: SFS Group International AG, Heerbrugg (CH)

( * ) Notice: Subject to any disclaimer, the term of this patent is extended or adjusted under 35 U.S.C. 154(b) by 23 days.

(21) Appl. No.: 18/531,917

(22) Filed: Dec. 7, 2023

(65) Prior Publication Data

US 2024/0191788 A1     Jun. 13, 2024

(30) Foreign Application Priority Data

Dec. 22, 2022    (EP) .................................... 22216216

(51) Int. Cl.
*F16H 25/00*        (2006.01)
*F16H 25/22*        (2006.01)
*F16H 25/20*        (2006.01)

(52) U.S. Cl.
CPC . *F16H 25/2214* (2013.01); *F16H 2025/2062* (2013.01)

(58) Field of Classification Search
CPC ......... F16H 25/2214; F16H 2025/2062; F16H 25/2247; F16H 25/2228; F16H 25/2204
See application file for complete search history.

(56) References Cited

U.S. PATENT DOCUMENTS

| | | | | |
|---|---|---|---|---|
| 6,736,235 B2 * | 5/2004 | Yoshida | .............. | B62D 5/0427 |
| | | | | 180/444 |
| 2002/0063014 A1 * | 5/2002 | Yoshida | .............. | F16H 25/2223 |
| | | | | 180/444 |
| 2019/0323586 A1 * | 10/2019 | Peric | ................... | F16H 25/2209 |
| 2022/0097752 A1 * | 3/2022 | Enomoto | ................. | B62D 3/08 |

FOREIGN PATENT DOCUMENTS

| | | | | |
|---|---|---|---|---|
| DE | 102010050175 A1 * | 5/2012 | ......... | F16H 25/2214 |
| DE | 102017109140 A1 * | 10/2018 | ......... | F16H 25/2015 |
| DE | 102018131064 A1 * | 6/2019 | ......... | F16H 25/2214 |
| DE | 112019007133 T5 * | 12/2021 | .............. | B62D 3/08 |
| EP | 3763970 A1 * | 1/2021 | ............ | B21D 28/32 |
| EP | 3763970 B1 | 1/2021 | | |
| FR | 3072348 A1 * | 4/2019 | ........... | B60T 13/745 |
| WO | WO-2010043253 A1 * | 4/2010 | ........... | B62D 5/0448 |

* cited by examiner

*Primary Examiner* — Zakaria Elahmadi
(74) *Attorney, Agent, or Firm* — Volpe Koenig

(57) ABSTRACT

A ball screw drive having a threaded spindle and a spindle nut enclosing the spindle coaxially. At least two radially outwardly open channels are oriented axially in parallel and are simultaneously pressed into the lateral surface, the channels open toward a common front face of the spindle nut. Balls circulate in a helical ball race in the space between the spindle and the nut. A ball return guide has two ball deflectors and a transfer channel running therebetween. A drive element is operatively connected coaxially to the spindle nut and applies a torque onto the spindle nut. The operative connection between the drive element and the spindle nut is formed by a contact surface with a connecting contour and a catch element (designed such that in the assembled state it engages in one of the channels. The ball screw drive can be used as an actuating element.

9 Claims, 3 Drawing Sheets

BALL SCREW DRIVE

CROSS-REFERENCE TO RELATED APPLICATIONS

This application claims priority from European Patent Application No. 22216216.6, filed Dec. 12, 2022, which is incorporated herein by reference as if fully set forth.

TECHNICAL FIELD

The present invention relates to a ball screw drive with a specifically designed spindle nut and the use of such a ball screw drive.

BACKGROUND

A roller screw drive with balls as the rolling bodies is generally denoted as a ball screw or also as a ball screw drive. The main constituent parts of a ball screw drive include a threaded spindle and a spindle nut which encompasses this spindle. During operation, balls circulate between these two components. The thread flights of the threaded spindle and the spindle nut are configured as ball grooves with a suitable profile and are adapted to one another in a complementary manner such that together they form a ball race or a ball guide in the assembled state. In contrast to a screw-nut connection in which the thread flanks slide on one another in a planar manner, in the ball screw drive the circulating balls in the thread take over the transmission of the load between the nut and spindle. The planar sliding movement is thus replaced by a rolling movement which is associated with reduced friction.

Ball return guides are used in order to obtain a closed recirculation track for the balls. These ball return guides are composed of two ball deflectors and a transfer channel located therebetween. The ball deflectors have the task of lifting out the balls from the ball guide at a first location between the spindle nut and the threaded spindle and feeding the balls back at a second location. A ball return guide thus represents as a whole a bypass which bridges one or more thread flights of the nut-spindle system and thus forms a closed recirculation track for the balls of a ball screw drive. Generally, the balls in the spindle nut are lifted radially outwardly from the ball groove and guided inside or outside the spindle nut in a channel or a tube (the transfer channel) before they are re-inserted into the ball race between the threaded spindle and the spindle nut at the location provided therefor. The forces which are released when the balls are lifted out from the ball guide have to be absorbed or diverted by the ball deflector.

From a technical perspective, a ball screw drive operates as a screw drive which can convert a rotational movement into a longitudinal movement, or vice versa, wherein the step-down ratio or step-up ratio is determined by the dimensioning of the threaded spindle and the pitch of the thread.

Ball screw drives are used in many technical applications, where a longitudinal movement is intended to be achieved by means of an electric motor and not via a hydraulically or pneumatically operated cylinder. Ball screw drives play an increasing role in electromechanical and electrohydraulic braking systems, where ball screw drives are used as a replacement for hydraulically actuated brake cylinders or in brake assistance systems in parallel with known braking systems. Here they assist with increasing the braking force of a driver or introducing or assisting an (emergency) braking procedure as part of a safety system. Purely electrically operated braking systems with ball screw drives are thus possible as a replacement brake cylinder on each wheel.

The manufacture of a spindle nut is intended to be considered in more detail hereinafter. The spindle nut comprises, in principle, a hollow-cylindrical base body with an axial internal thread which is configured as the top shell of the ball recirculation groove. This base body can be manufactured as a whole as a turned/milled part which is very time-consuming. For some time, therefore, spindle nuts have been manufactured substantially as pressed parts from wire portions which only have to be post-machined at a few points by turning or milling for reasons of dimensional accuracy.

Conventionally a significant degree of effort in terms of machining is dispensed with in the production of the actual transfer channel in the spindle nut between the removal location and the return location. This transfer channel is generally drilled as a channel or milled as a slotted groove in the lateral surface of the spindle nut. A slotted groove has to be covered after the ball screw drive has been assembled and filled with balls. This can be implemented by a collar which is pushed on or has to be pressed on, or alternatively by a bearing which has to be provided in any case at this point, a flanged mounting or a sleeve.

In this regard, ball screw drives are relatively complex structural elements which are expensive to produce, and a mass production with reasonable costs requires novel approaches.

PRIOR ART

A method for manufacturing a ball screw drive is described in EP 3 763 970 by which at least two axially parallel channels are pressed into the lateral surface of a spindle nut. These channels can be used as transfer channels-supplemented by additional elements.

SUMMARY

The object of the invention is to propose a ball screw drive which uses the principle of pressed-in channels in the lateral surface for further add-on elements.

This object is achieved by a ball screw drive having one or more of the features disclosed herein. Advantageous embodiments of the invention are specified below and in the claims.

A ball screw drive of the type in question comprises, in principle, the following main elements: a threaded spindle and a spindle nut which at least partially encloses the threaded spindle coaxially. Generally, the spindle nut has a substantially cylindrical lateral surface. "Substantially cylindrical" is understood to mean that in principle the lateral surface has a cylindrical shape, wherein surface portions which deviate from the cylindrical shape, such as for example planar flattened portions, fastening flanges or clamping surfaces, are not excluded.

A plurality of balls circulate in a helical (thread-like) ball race in the intermediate space between the threaded spindle and the spindle nut. At least one ball return guide ensures, by two ball deflectors and a transfer channel running therebetween, an endless track for the circulating balls. Depending on the rotational direction of the ball screw drive, the balls are radially lifted out of the ball race and deflected into the transfer channel by the one ball deflector. After passing through the transfer channel, the balls are guided out of the transfer channel back into the ball race by the other ball deflector.

The ball screw drive also has at least two radially outwardly open channels which are oriented axially in parallel and which are manufactured by being simultaneously pressed into the lateral surface. "Channel" is understood to mean here a linear recess in the surface (lateral surface) of the spindle nut. The length, depth and shape are dictated by the technical function required. Generally such channels have to be incorporated by milling procedures which are complex and which increases the cost of the manufacture thereof. The axial central channel and said axially parallel channels can be pressed in at the same time by a simultaneous pressing process (cold forming). As a result, the material displacement during the pressing process is controlled. As a result, said channels are also open toward a common front face of the spindle nut. Wire portions made of deformable steel serve as the starting material.

The ball screw drive also comprises a drive element which is operatively connected coaxially to the spindle nut and is designed to apply a torque onto the spindle nut. Ball screw drives can be implemented in principle by a driven spindle nut or driven threaded spindle. Thus, depending on the type of use, a drive element can also act as an output element, as described. The term "drive element" is not used here in a specifically limiting manner. In the present case, the drive is preferably implemented by a drive element which is mechanically connected to the spindle nut.

The operative connection between the drive element and the spindle nut is achieved according to the invention by at least two structural or functional components. The operative connection is built up, on the one hand, on a contact surface with a connecting contour. "Contact surface" is understood to mean the regions where the drive element and the spindle nut are in planar contact in the installed state. "Connecting contour" is understood to mean the shaping or nature of this contact surface. This contact surface can consist, for example, of internal cylindrical (drive element) or external cylindrical (spindle nut) surfaces which are machined to fit. These surfaces between the drive element and the spindle nut can act, amongst other things, positively, permitting a frictional connection or a clamping seat.

A catch element is provided as a second structural or functional component which is designed such that in the assembled state it engages in one of the channels of the spindle nut. The engagement can be implemented as a positive connection which fills up the entire channel covered by the drive element, or engages only in some portions, as is important or necessary for the torque transmission. Moreover, the catch element can be designed such that it bears only against the channel flanks for engagement, but not against the channel bottom. The catch element could also simply adopt the shape of a driver pin.

As known in the prior art, depending on the use a ball screw drive is substantially produced from metal, for example from suitable types of steel. The ball deflectors are generally produced from plastics or light metal and inserted into corresponding milled openings in the spindle nut.

Depending on the drive concept, the drive element can be configured as a gearwheel, as a toothed belt disk or as a coupling element.

During assembly, the drive element is pushed from the front face onto the lateral surface of the spindle nut and anchored there in the contact region. Depending on the technical circumstances, the connecting contour in the region of the contact surface can be configured as an interference fit with polished surfaces or as a press fit by using a tolerance sleeve or a clamping device. "Clamping device" might be understood to mean locking rings or pins or the result of pressing, caulking or other known methods.

In a development of the invention, the catch element can be designed on the drive element as a radially inwardly protruding tongue which positively engages in one of the channels as in a groove. Alternatively, the catch element can be configured as a separate wedge and act as part of a wedge connection between the drive element and the spindle nut.

Moreover, the (at least one) ball return guide can use one of the channels as a transfer channel. Supplemented by two ball deflectors which are accordingly incorporated in the spindle nut, a complete ball return guide is achieved thereby. This results in the situation that the ball return guide and the catch element use the same channel. Since a transfer channel only requires a spatially defined portion of the channel, depending on the design of the ball return guide or the drive element, space can be present for both. Alternatively, the ball return guide and the catch element can naturally each use a separate channel. This is also dependent on the design of the ball screw drive.

A ball screw drive as described herein can be used as an actuating element in a brake booster system. Here the braking intention of a driver is converted as an electrical signal by a ball screw drive which acts on a hydraulic piston. A use as a mechanical actuating element directly in a brake is also possible, for example by installing in a brake caliper, wherein the ball screw drive directly presses a brake lining against a brake disk. These examples of use are not definitive.

BRIEF DESCRIPTION OF THE DRAWINGS

The invention is now explained by way of example with reference to the accompanying drawings using particularly preferred embodiments.

DETAILED DESCRIPTION

Figure 1:
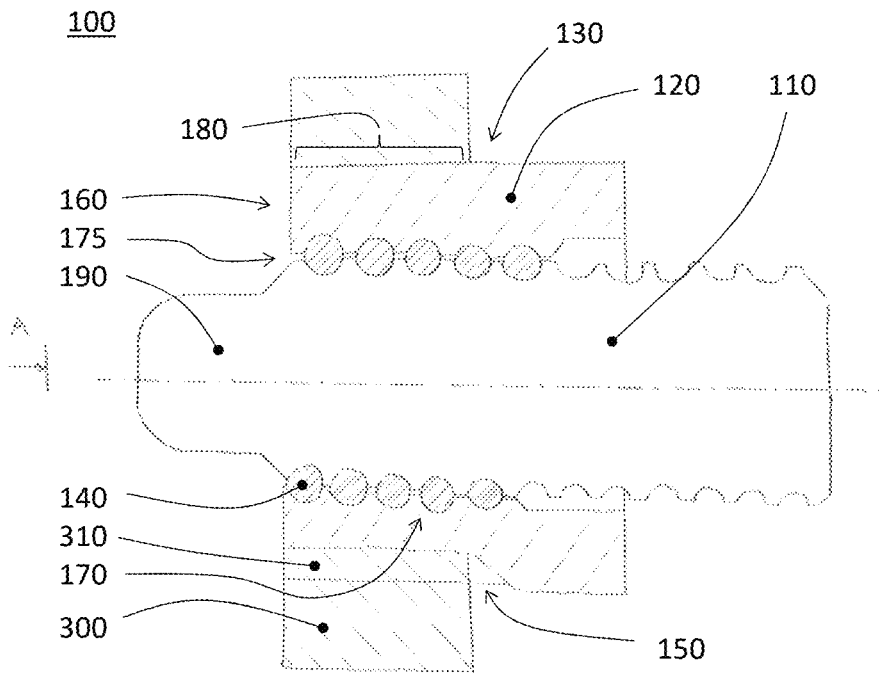
FIG. 1 shows a cross section through a ball screw drive according to the invention with additional elements.
Figure 3:
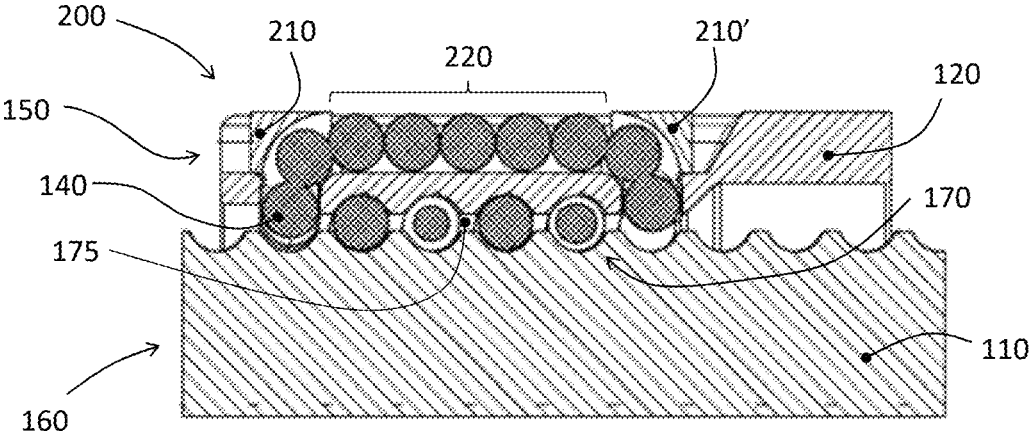
FIG. 3 shows a ball return guide in detail.

FIG. 1 shows a longitudinal cross section through a ball screw drive 100 according to the present invention. FIG. 3 shows a front view of the ball screw drive 100. The main constituent parts are the central threaded spindle 110 and the substantially hollow-cylindrical spindle nut 120 which partially surrounds the central threaded spindle coaxially. An annular gap 175 with the ball race 170 which serves a thread-shaped helical channel for the circulating balls 140 is located between the outer face of the threaded spindle 110 and the inner face of the spindle nut 120. The threaded spindle 110 has a lateral surface 130 (here substantially cylindrical). A region of the lateral surface 130 facing the front face 160 forms a contact surface 180 which forms a cylinder surface in the example shown. In the installed (assembled) state, the spindle nut 120 and a drive element 300 are in contact in the region of this contact surface 180. The drive element 300, shown separately in FIG. 4, has a catch element 310 which (here positively) engages in a channel 150 which is incorporated in the lateral surface 130 in the region of the contact surface 180.

The spherically configured pin projection 190 is shown here as a component which can engage, for example, in a socket of a brake piston and can displace this brake piston.

FIG. 1 does not show any further application-specific attachments and supplementary parts, such as axial bearings or receivers for the ball screw drive. A person skilled in the art will add these components if required.

Figure 2:
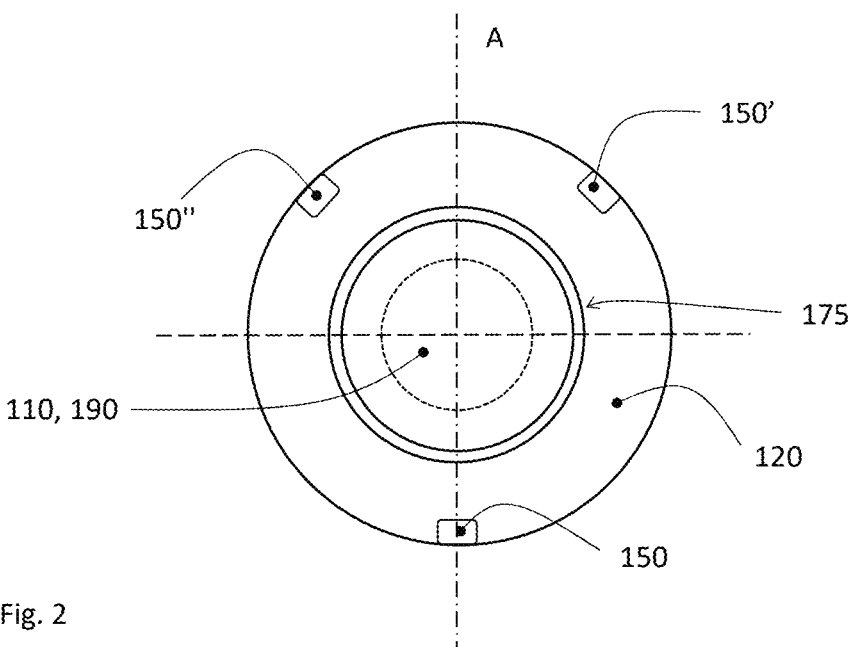
FIG. 2 shows a front view taken in the direction A indicated in FIG. 1 of the spindle nut.

FIG. 2 shows the ball screw drive 100 in a front view A. The focus is placed here on the symmetrical arrangement of three channels 150, 150', 150" in the spindle nut 120, viewed from the front from the pin projection 190. The position of the threaded spindle 110 and the annular gap 175 is shown. The shaping of the channels 150, 150', 150" is by way of example.

FIG. 3 shows a ball return guide 200 as could be used in a ball screw drive according to the invention. The image shows a detail of a cross section with the threaded spindle 110 and spindle nut 120. The spindle nut 120 shows a channel 150' which is pressed in from the front face 160. The ball deflectors 210 and 210' guide the balls 140 to and from between the ball race 170 and the transfer channel 220. The ball race is arranged in the annular gap 175 between the threaded spindle 110 and spindle nut 120.

Figure 4:
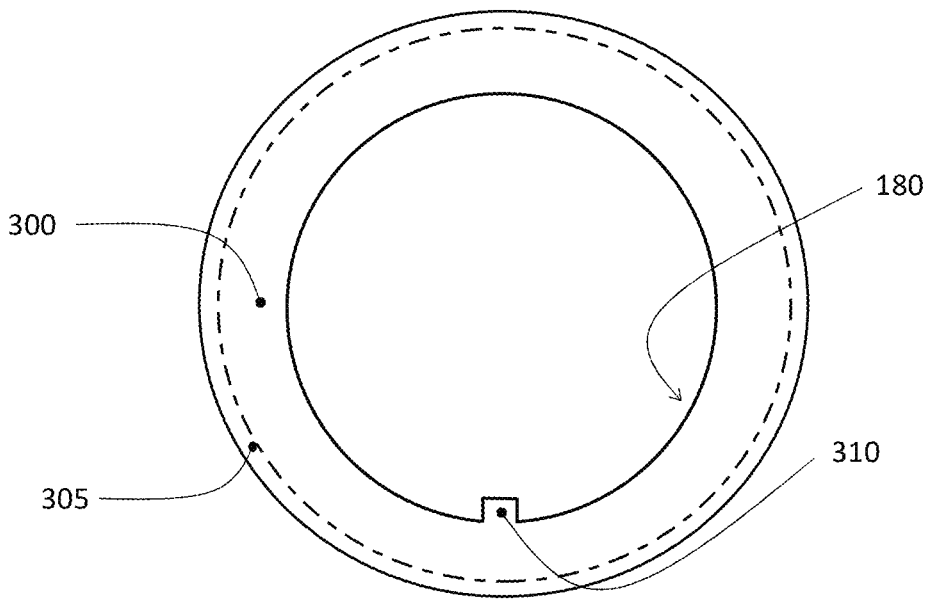
FIG. 4 shows a front view of the drive element of FIG. 1 in detail.

FIG. 4 shows the drive element 300 as a gearwheel 305 exhibiting a radially inwardly directed tongue 310. Said tongue is an embodiment of the catch element. Contact surface 180 is designed to match the outer surface of spindle nut 120 (see FIGS. 2 and 4).

Figure 5:
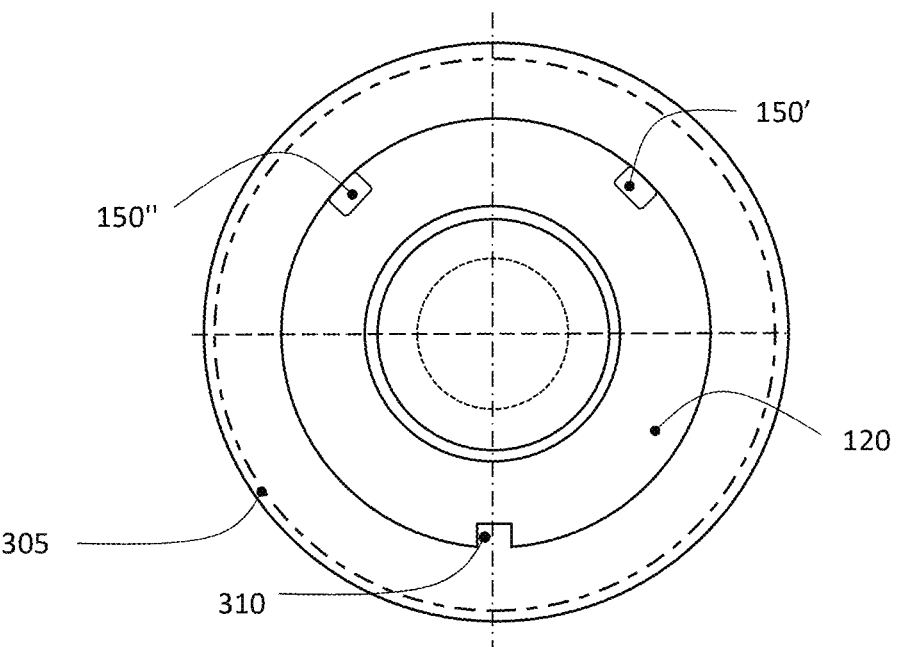
FIG. 5 shows a front view taken in the direction A indicated in FIG. 1 of the ball screw drive.

FIG. 5 shows the drive element 300 on the spindle nut 120 as shown in FIG. 2. The catch element or tongue 310 engages in channel 150 (see also FIG. 2) to establish an operative connection between the drive element (gearwheel) 300 and the spindle nut 120.

The invention claimed is:

1. A ball screw drive (100), comprising: a threaded spindle (110); a spindle nut (120) which at least partially encloses the threaded spindle (110) coaxially, the spindle nut has a substantially cylindrical lateral surface (130); at least two radially outwardly open channels (150, 150') which are simultaneously pressed into the lateral surface and are oriented axially in parallel, said open channels (150, 150') are open toward a common front face (160) of the spindle nut (120); a plurality of balls (140) which circulate in a helical ball race (170) in the intermediate space between the threaded spindle (110) and the spindle nut (120); at least one ball return guide (200) with two ball deflectors (210, 210') and a transfer channel (220) running therebetween; wherein, depending on a rotational direction of the ball screw drive (100), the balls (140) are radially lifted out of the ball race (170) and deflected into the transfer channel (220) by one of the ball deflectors (210) and after passing through the transfer channel the balls are guided out of the transfer channel (220) back into the ball race (170) by the other of the ball deflectors (210'); a drive element (300) which is operatively connected coaxially to the spindle nut (120) via an operative connection and is designed to apply a torque onto the spindle nut (120);

the operative connection between the drive element (300) and the spindle nut (120) is formed at least by a contact surface (180) with a connecting contour and a catch element (310) which is designed such that in an assembled state the catch element engages in one of the channels (150, 150') of the spindle nut (120); and the at least one ball return guide uses one of the open channels as the transfer channel.

2. The ball screw drive as claimed in claim 1, wherein the drive element (300) is configured as a gearwheel (305), as a toothed belt disk, or as a coupling element.

3. The ball screw drive as claimed in claim 1, wherein the drive element is pushed from the front face onto the lateral surface of the spindle nut and anchored there at the contact surface.

4. The ball screw drive (100) as claimed in claim 1, wherein the connecting contour in a region of the contact surface (180) is configured as an interference fit with polished surfaces or as a press fit by using a tolerance sleeve or a clamping device.

5. The ball screw drive as claimed in claim 1, wherein the catch element is designed on the drive element as a radially inwardly protruding tongue which positively engages in one of the open channels as a groove.

6. The ball screw drive as claimed in claim 1, wherein the catch element is configured as a wedge and acts as part of a wedge connection between the drive element and the spindle nut.

7. The ball screw drive as claimed in claim 1, wherein the ball return guide and the catch element use a same one of the open channels.

8. The ball screw drive as claimed in claim 1, wherein the ball return guide and the catch element each use a separate one of the open channels.

9. A brake booster system comprising the ball screw drive as claimed in claim 1.

\* \* \* \* \*